United States Patent
Lee et al.

(10) Patent No.: US 10,476,091 B2
(45) Date of Patent: Nov. 12, 2019

(54) FUEL CELL PURGING CONTROL METHOD

(71) Applicant: Hyundai Motor Company, Seoul (KR)

(72) Inventors: Hyun Jae Lee, Seoul (KR); Dae Jong Kim, Gyeonggi-Do (KR); Yei Sik Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 328 days.

(21) Appl. No.: 15/351,975

(22) Filed: Nov. 15, 2016

(65) Prior Publication Data

US 2017/0288245 A1    Oct. 5, 2017

(30) Foreign Application Priority Data

Apr. 1, 2016   (KR) .......................... 10-2016-0040330

(51) Int. Cl.
  *H01M 8/04746*   (2016.01)
  *H01M 8/04223*   (2016.01)
  *H01M 8/04992*   (2016.01)

(52) U.S. Cl.
  CPC ... *H01M 8/04753* (2013.01); *H01M 8/04231* (2013.01); *H01M 8/04992* (2013.01); *H01M 2250/20* (2013.01)

(58) Field of Classification Search
  CPC ..................... H01M 8/04753; H01M 8/04231
  USPC ........................................................ 429/444
  See application file for complete search history.

(56) References Cited

U.S. PATENT DOCUMENTS

| | | | | |
|---|---|---|---|---|
| 2006/0099466 A1* | 5/2006 | Wake | ................ | H01M 8/04231 429/444 |
| 2008/0044691 A1* | 2/2008 | Wake | ................ | H01M 8/04007 429/429 |
| 2008/0248341 A1* | 10/2008 | Matsumoto | ......... | H01M 8/0662 429/412 |
| 2009/0035614 A1* | 2/2009 | Wake | ................ | H01M 8/04179 429/408 |
| 2009/0286112 A1* | 11/2009 | Oh | .................... | H01M 8/04089 429/431 |
| 2011/0076584 A1 | 3/2011 | Katano | | |
| 2015/0056527 A1* | 2/2015 | Kim | .................. | H01M 8/04141 429/414 |

(Continued)

FOREIGN PATENT DOCUMENTS

JP    2006-282101 A    10/2006
JP    4378735 B1    12/2009

(Continued)

*Primary Examiner* — Abdullah A Riyami
*Assistant Examiner* — Nader J Alhawamdeh
(74) *Attorney, Agent, or Firm* — Mintz Levin Cohn Ferris Glovsky and Popeo, P.C.; Peter F. Corless

(57) ABSTRACT

A fuel cell purging control method for controlling hydrogen purge of a fuel cell including a stack having an anode and a cathode, an air supply device having an air supply line supplying air to the cathode of the stack, a back pressure adjusting valve adjusting back pressure of the air supply device, and a hydrogen supply device supplying hydrogen to the anode of the stack, includes steps of: determining hydrogen purge of the fuel cell while the fuel cell is being normally operated, reducing back pressure of the air supply line of the fuel cell when the hydrogen purge is determined, and purging hydrogen in the anode of the fuel cell for a preset period of time after the step of reducing the back pressure.

7 Claims, 4 Drawing Sheets

(56) References Cited

U.S. PATENT DOCUMENTS

| | | | |
|---|---|---|---|
| 2015/0188164 A1* | 7/2015 | Yu | H01M 8/04089 |
| | | | 429/415 |
| 2016/0079620 A1* | 3/2016 | Son | H01M 8/04753 |
| | | | 429/444 |
| 2017/0288245 A1* | 10/2017 | Lee | H01M 8/04753 |

FOREIGN PATENT DOCUMENTS

| | | |
|---|---|---|
| KR | 2010-0044933 A | 5/2010 |
| KR | 2012-0004816 A | 1/2012 |
| KR | 10-1481310 B1 | 1/2015 |
| KR | 10-2015-0026265 A | 3/2015 |
| KR | 10-1567238 B1 | 11/2015 |

\* cited by examiner

FUEL CELL PURGING CONTROL METHOD

CROSS-REFERENCE TO RELATED APPLICATION

This application claims under 35 U.S.C. § 119(a) the benefit of Korean Patent Application No. 10-2016-0040330, filed on Apr. 1, 2016 in the Korean Intellectual Property Office, the entire contents of which are incorporated by reference herein.

BACKGROUND

(a) Technical Field

The present invention relates to a fuel cell purging control method for purging hydrogen in a fuel cell stack, and more particularly, to a fuel cell purging control method capable of reducing power consumption, purging hydrogen, and supplying air by preventing the revolutions per minute (RPM) of an air supply device unit from being excessively increased when hydrogen is purged.

(b) Description of the Related Art

In general, a fuel cell is a type of power generation system generating electric energy according to an electrochemical reaction of hydrogen and oxygen (oxygen in the air). For example, a fuel cell system is employed in a fuel cell vehicle to operate an electric motor to drive a vehicle.

A fuel cell includes a stack as an electricity generating assembly of unit fuel cells having an anode and a cathode, an air supply device supplying air to the cathode, and a hydrogen supply device supplying hydrogen to the anode.

The air supply device may have an air supply unit such as an air blower or an air compressor and a humidifier humidifying supplied air.

In the fuel cell, hydrogen including impurities such as nitrogen, water, vapor, and the like, generated in the anode of the stack may be periodically purged to uniformly maintain a hydrogen concentration in the anode of the stack.

Meanwhile, when hydrogen is purged while a fuel cell is being operated, the purged hydrogen is discharged to a downstream side of the air supply device, in particular, to a downstream side (rear stage) of the humidifier, generating a pressurization effect on the downstream side of the air supply line of the air supply device to increase back pressure in the air supply line and cause an air supply amount to be temporarily lowered Thus, in order to appropriately control the air supply amount by the air supply unit, an RPM of the air supply unit may be increased.

However, the RPM of the air supply unit may be excessively increased to adjust a target air supply amount (RPM overshoot), and the RPM overshoot of the air supply unit may cause severe power consumption of the air supply unit and degrade fuel efficiency of a fuel cell.

SUMMARY

An aspect of the present invention provides a fuel cell purging control method capable of reducing power consumption and smoothly purging hydrogen and smoothly supplying air by preventing revolutions per minute (RPM) of an air supply device unit from being excessively increased when hydrogen is purged.

According to an exemplary embodiment of the present invention, a fuel cell purging control method for controlling hydrogen purge of a fuel cell including a stack having an anode and a cathode, an air supply device having an air supply line supplying air to the cathode of the stack, a back pressure adjusting valve adjusting back pressure of the air supply device, and a hydrogen supply device supplying hydrogen to the anode of the stack, includes steps of: determining, by a controller, the hydrogen purge of the fuel cell while the fuel cell is being normally operated; reducing back pressure of the air supply line of the fuel cell, by adjusting the back pressure adjusting valve, when the hydrogen purge is determined; and purging hydrogen in the anode of the fuel cell, by opening a purge valve, for a set period of time after the step of reducing the back pressure.

When an accumulated charge amount of the fuel cell is greater than a set value, the hydrogen purge may be determined. When the hydrogen purge is determined, an open angle of the back pressure adjusting valve may be increased by a predetermined increment, relative to a set open angle, and the set open angle may be an open angle of the back pressure adjusting valve when the fuel cell is normally operated.

When the hydrogen purge is determined, an air supply amount may be reduced by a predetermined decrement, relative to a set air supply amount, and the set air supply amount may be an air supply amount when the fuel cell is normally operated.

According to another exemplary embodiment of the present invention, a fuel cell purging control method for controlling hydrogen purge of a fuel cell including a stack having an anode and a cathode, an air supply device having an air supply line supplying air to the cathode of the stack, and a hydrogen supply device supplying hydrogen to the anode of the stack, includes steps of: determining, by a controller, the hydrogen purge of the fuel cell while the fuel cell is being normally operated; fixing an RPM of the air supply unit of the fuel cell to a previous RPM and maintaining the RPM when hydrogen purge is determined in the purge determining operation; and purging hydrogen in the anode of the fuel cell for a set period of time after the step of fixing the RPM. When an accumulated charge amount of the fuel cell is greater than a set value, the hydrogen purge may be determined.

A fuel cell purging control system for controlling hydrogen purge of a fuel cell can include: a stack having an anode and a cathode; an air supply device having an air supply line supplying air to the cathode of the stack; a back pressure adjusting valve configured to adjust back pressure of the air supply device when the hydrogen purge is determined; a hydrogen supply device supplying hydrogen to the anode of the stack; and a purge valve configured to purge hydrogen in the anode of the fuel cell for a preset period of time after the back pressure adjusting valve is opened, wherein the hydrogen purge of the fuel cell is determined while the fuel cell is being normally operated.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
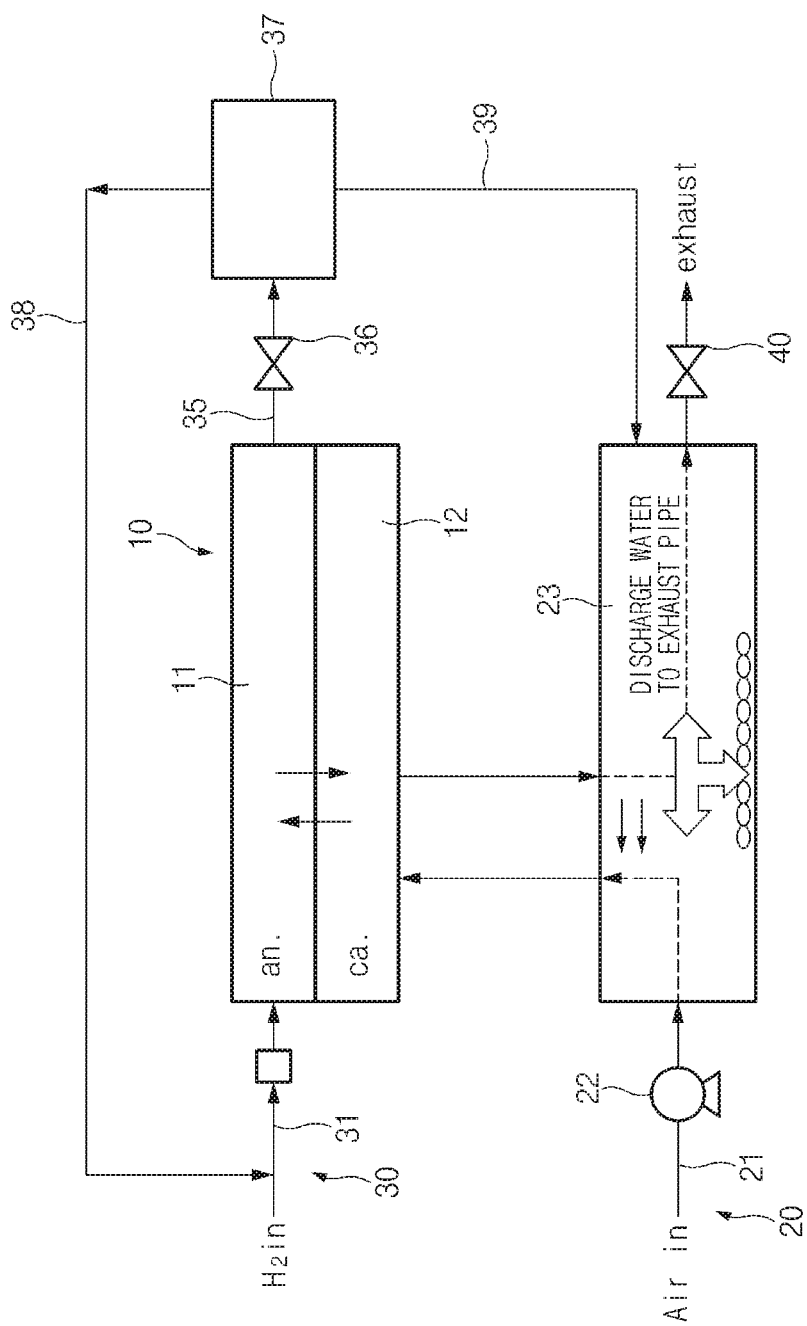
FIG. 1 is a schematic view illustrating a fuel cell.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiment of the present invention will be described in detail with reference to the accompanying drawings. For reference, dimensions of elements or thicknesses of lines illustrated in the drawings referred to describe the present invention may be exaggerated for the convenience of understanding. Also, the terms used henceforth have been defined in consideration of the functions of the present invention, and may be altered according to the intent of a user or operator, or conventional practice. Therefore, the terms should be defined on the basis of the entire content of this specification.

Referring to FIG. 1, a fuel cell may include a stack 10 having an anode 11 and a cathode 12, an air supply device 20 supplying air to the cathode 12 of the stack 10, and a hydrogen supply device 30 supplying hydrogen to the anode 11 of the stack 10.

The stack 10 may be configured as an electricity generating assembly of unit fuel cells each having the anode 11 and the cathode 12.

The air supply device 20 may include an air supply line 21 connected to the cathode 12 of the stack 10 and an air supply unit 22 installed at the air supply line 21.

The air supply unit 22 may be configured as an air blower or an air compressor driven by electric energy to forcibly supply air to the cathode 12 of the stack 10.

A humidifier 23 is installed in the middle of the air supply line 21 and humidifies air supplied from the air supply unit 22.

A back pressure adjusting valve 40 adjusting back pressure of the air supply line 21 may be installed in the humidifier 23, and in particular, the back pressure adjusting value 40 may also be installed on a rear stage of the humidifier 23 as illustrated in FIG. 1.

The hydrogen supply device 30 may include a hydrogen supply line 31 connected to the anode 11 of the stack 10, a hydrogen storage (not shown) storing hydrogen, and the like.

A purge line 35 may be connected to the anode 11 of the stack 10, and a purge valve 36 is configured to be opened when hydrogen is purged. Further, a water trap 37 collecting generation water generated within the stack 10 may be installed in the middle of the purge line 35.

A recirculation line 38 recirculating unused hydrogen to the anode 11 of the stack 10 may be connected to one side of the water trap 37.

A discharge line 39 discharging generation water within the stack 10 and/or purged hydrogen toward the humidifier 23 may be connected to the other side of the water trap 37.

When the anode 11 of the stack 10 purges hydrogen, the purge valve 36 is open, and accordingly, hydrogen may be purged through the purge line 35 and discharged toward a rear stage of the humidifier 23 through the water trap 37.

When air is supplied through the air supply line 21, opening and closing of the back pressure adjusting valve 40 of the humidifier 23 is appropriately adjusted to appropriate adjust back pressure in the air supply line 21.

Figure 2:
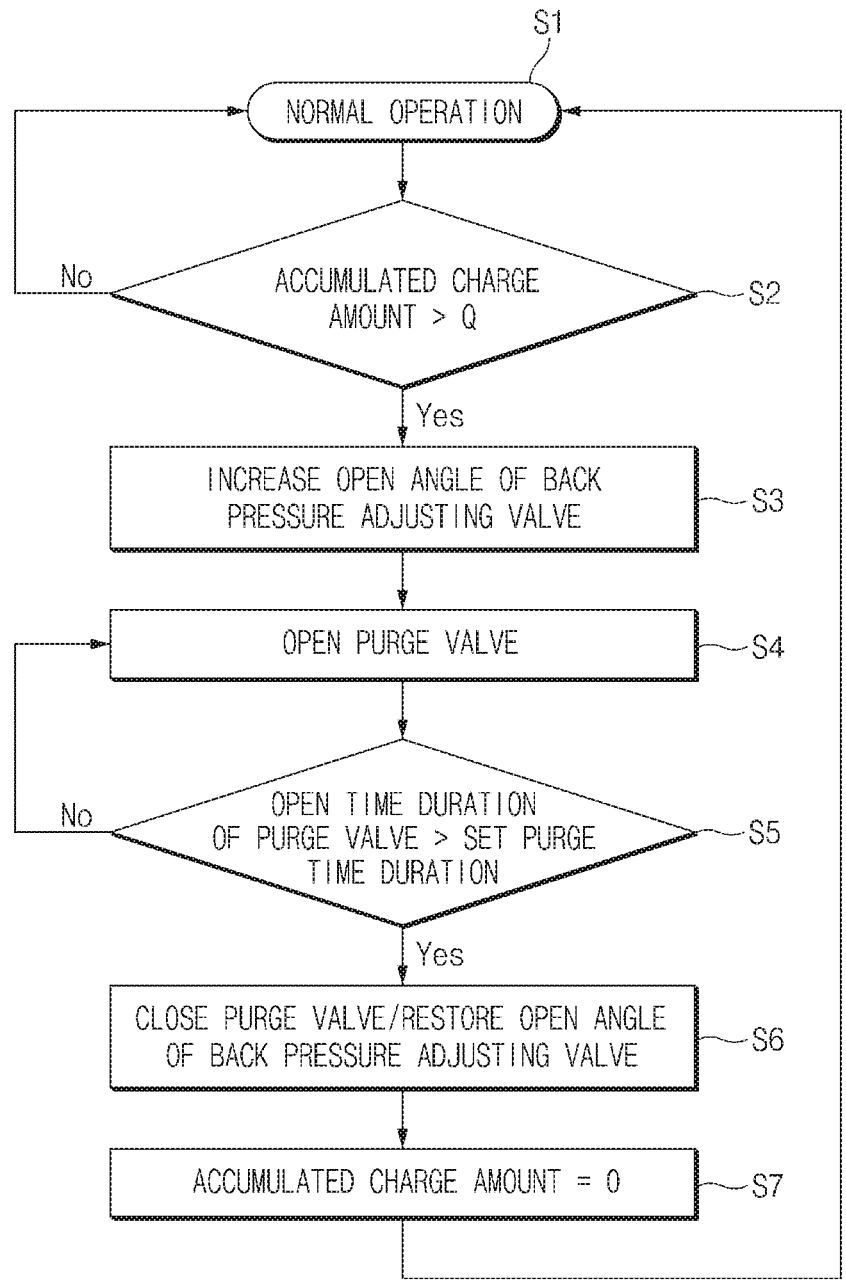
FIG. 2 is a flow chart illustrating a fuel cell purging control method according to a first exemplary embodiment of the present invention.

FIG. 2 is a flow chart illustrating a fuel cell purging control method according to a first exemplary embodiment of the present invention.

Referring to FIG. 2, while the fuel cell is normally operated in operation S1, whether to execute hydrogen purge may be determined by determining whether hydrogen purge is required in the anode 11 of the stack 10 in operation S2. For example, whether or not to execute hydrogen purge can be determined by a controller of the fuel cell.

In detail, in a case in which an accumulated charge amount of the fuel cell is greater than or equal to a set value Q, it is determined that hydrogen purge is required in the anode 11 of the stack 10 and execution of hydrogen purge may be determined, and in a case in which an accumulated charge amount of the fuel cell is smaller than the set value Q, it is determined that hydrogen purge is not required and hydrogen purge is not executed.

Here, the set value Q may be set to be varied through a map of accumulated charge amounts experimentally calculated according to changes in current, coolant temperature, and the like.

When hydrogen purge is determined, an open angle of the back pressure adjusting valve 40 may be increased to be greater than a set open angle or the back pressure adjusting valve 40 may be fully opened in operation S3. Here, the set open angle refers to an open angle of the back pressure adjusting valve 40 in a state in which the fuel cell is normally operated before hydrogen purge is determined, and may be set to be varied through a map of open angles experimentally calculated according to changes in air flow rate, coolant temperature, and the like.

In this manner, since the open angle of the back pressure adjusting valve 40 is increased to be greater than that of a previous state, even though hydrogen purged according to a hydrogen purge operation is discharged to the rear stage of the humidifier 23, back pressure of the air supply line 21 is prevented from being increased, whereby RPM overshoot in which RPM of the air supply unit 22 is excessively increased may be prevented. Thus, since RPM overshoot is prevented, a waste of electric energy consumed in the air supply unit 22 may be prevented.

Thereafter, in a state in which the open angle of the back pressure adjusting valve 40 is increased, the purge valve 36 is opened in operation S4 to allow hydrogen to be purged in the anode 11 of the stack 10.

Thereafter, it is determined whether a time duration in which the purge valve 36 is open is greater than or equal to a set purge time duration P in operation S5. Here, the purge time duration P may be set to be varied through a map of purge time durations experimentally calculated according to changes in currents, coolant temperatures, and the like.

When the time duration in which the purge valve 36 is open is greater than or equal to the set purge time duration, the purge valve 36 is closed and the open angle of the back pressure adjusting valve 40 is recovered to the original state in operation S6.

As the purge valve 36 is closed, hydrogen purge is stopped. In this state, an accumulated charge amount of the fuel cell may be set to "0" in operation S7, and a normal operation of the fuel cell may be resumed in operation S1.

Figure 3:
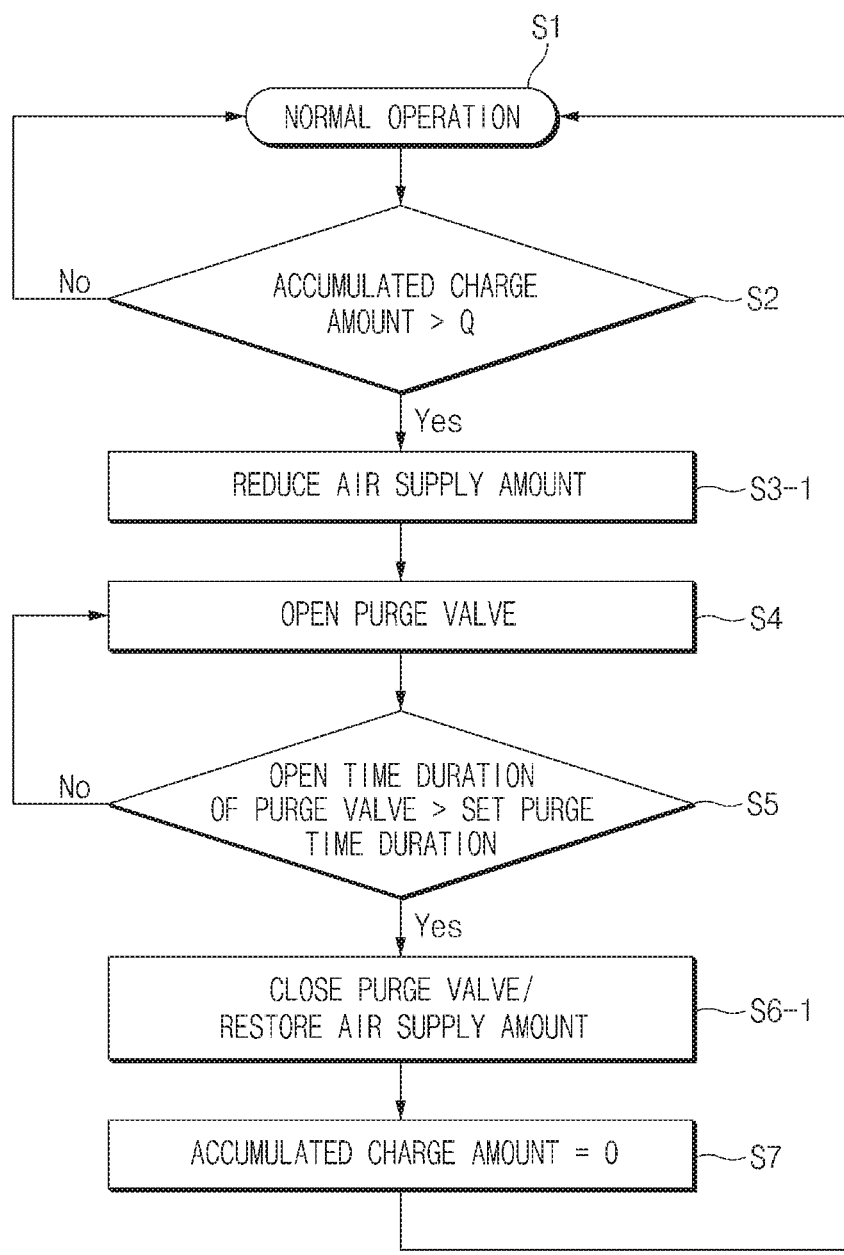
FIG. 3 is a flow chart illustrating a fuel cell purging control method according to a second exemplary embodiment of the present invention.

FIG. 3 is a flow chart illustrating a fuel cell purging control method according to a second exemplary embodiment of the present invention.

Referring to FIG. 3, while the fuel cell is normally operated in operation S1, whether to execute hydrogen purge may be determined by determining whether hydrogen purge is required in the anode 11 of the stack 10 in operation S2.

In detail, in a case in which an accumulated charge amount of the fuel cell is greater than or equal to a set value Q, it is determined that hydrogen purge is requited in the anode 11 of the stack 10 and execution of hydrogen purge may be determined, and in a case in which an accumulated charge amount of the fuel cell is smaller than the set value Q, it is determined that hydrogen purge is not requited and hydrogen purge is not executed.

Here, the set value Q may be set to be varied through a map of accumulated charge amounts experimentally calculated according to changes in current, coolant temperature, and the like.

When hydrogen purge is determined, an air supply amount may be reduced to be smaller than a set air supply amount in operation S3-1. Here, the set air supply amount refers to an air supply amount in a state in which the fuel cell is normally operated before hydrogen purge is determined, and may be set to be varied through a map of air supply amounts experimentally calculated through currents, coolant temperatures, an RH estimator, and the like.

In this manner, since the air supply amount is reduced to be smaller than that of a previous state, even though hydrogen purged according to a hydrogen purge operation is discharged to the rear stage of the humidifier 23, back pressure of the air supply line 21 is prevented from being increased, whereby RPM overshoot in which RPM of the air supply unit 22 is excessively increased may be prevented. Thus, since RPM overshoot is prevented, a waste of electric energy consumed in the air supply unit 22 may be prevented.

Thereafter, in a state in which the air supply amount is reduced, the purge valve 36 is opened in operation S4 to allow hydrogen to be purged in the anode 11 of the stack 10.

Thereafter, it is determined whether a time duration in which the purge valve 36 is open is greater than or equal to a set purge time duration P in operation S5. Here, the purge time duration P may be set to be varied through a map of purge time durations experimentally calculated according to changes in currents, coolant temperatures, and the like.

When the time duration in which the purge valve 36 is open is greater than or equal to the set purge time duration, the purge valve 36 is closed and the air supply amount is recovered to the original state in operation S6-1.

As the purge valve 36 is closed, hydrogen purge is stopped. In this state, an accumulated charge amount of the fuel cell may be set to "0" in operation S7, and a normal operation of the fuel cell may be resumed in operation S1.

Figure 4:
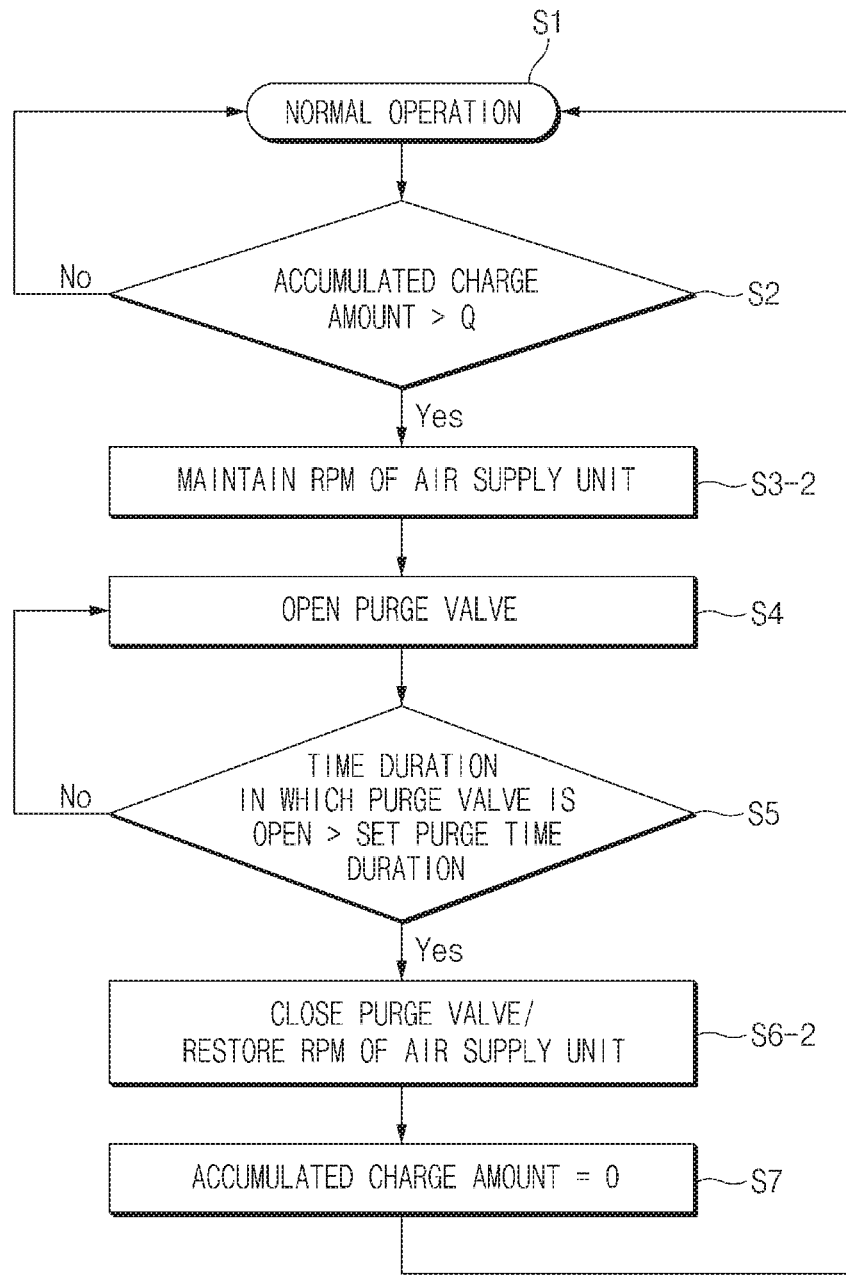
FIG. 4 is a flow chart illustrating a fuel cell purging control method according to a third exemplary embodiment of the present invention.

FIG. 4 is a flow chart illustrating a fuel cell purging control method according to a third exemplary embodiment of the present invention.

Referring to FIG. 4, while the fuel cell is normally operated in operation S1, whether to execute hydrogen purge may be determined by determining whether hydrogen purge is required in the anode 11 of the stack 10 in operation S2.

In detail, in a case in which an accumulated charge amount of the fuel cell is greater than or equal to a set value Q, it is determined that hydrogen purge is required in the anode 11 of the stack 10 and execution of hydrogen purge may be determined, and in a case in which an accumulated charge amount of the fuel cell is smaller than the set value Q, it is determined that hydrogen purge is not required and hydrogen purge is not executed.

Here, the set value Q may be set to be varied through a map of accumulated charge amounts experimentally calculated according to changes in current, coolant temperature, and the like.

When hydrogen purge is determined, an RPM of the air supply unit may be fixed to an RPM immediately before purge and maintained in operation S3-2. That is, since the RPM of the air supply unit 22 is fixed to the RPM immediately before purge and maintained, even though back pressure of the air supply line 21 is increased according to hydrogen purge, the RPM of the air supply unit 22 can be prevented from being increased, and thus, a waste of electric energy consumed in the air supply unit 22 may be prevented.

Thereafter, in a state in which the RPM of the air supply unit 22 is maintained at the previous RPM (before hydrogen purge), the purge valve 36 is opened in operation S4 to allow hydrogen to be purged in the anode 11 of the stack 10.

Thereafter, it is determined whether a time duration in which the purge valve 36 is open is greater than or equal to a set purge time duration P in operation S5. Here, the purge time duration P may be set to be varied through a map of purge time durations experimentally calculated according to changes in currents, coolant temperatures, and the like.

When the time duration in which the purge valve 36 is open is greater than or equal to the set purge time duration, the purge valve 36 is closed and the RPM of the air supply unit 22 may be recovered according to a target air supply flow rate in operation S6-2.

As the purge valve 36 is closed, hydrogen purge is stopped. In this state, an accumulated charge amount of the fuel cell may be set to "0" in operation S7, and a normal operation of the fuel cell may be resumed in operation S1.

According to the exemplary embodiments of the present invention, when hydrogen is purged, back pressure of the air supply line is reduced or the RPM of the air supply unit is maintained at the RPM in a previous state (that is, the RPM when the fuel cell is normally operated), whereby the RPM of the air supply device unit is prevented from being excessively increased, reducing power consumption and smoothly performing hydrogen purge and air supply.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A fuel cell purging control method for controlling hydrogen purge of a fuel cell including a stack having an anode and a cathode, an air supply device having an air supply line supplying air to the cathode of the stack, a back pressure adjusting valve adjusting back pressure of the air supply device, and a hydrogen supply device supplying hydrogen to the anode of the stack, the fuel cell purging control method comprising the steps of:
    determining, by a controller, the hydrogen purge of the fuel cell while the fuel cell is being normally operated;
    reducing the back pressure of the air supply line of the fuel cell, by adjusting the back pressure adjusting valve, when the hydrogen purge is determined; and
    purging hydrogen, by opening a purge valve, in the anode of the fuel cell for a preset period of time after the step of reducing the back pressure.

2. The fuel cell purging control method according to claim 1, wherein when an accumulated charge amount of the fuel cell is greater than a set value, the hydrogen purge is determined.

3. The fuel cell purging control method according to claim 1, wherein when the hydrogen purge is determined, an open angle of the back pressure adjusting valve is increased by a predetermined increment, relative to a set open angle, and
    the set open angle is an open angle of the back pressure adjusting valve when the fuel cell is normally operated.

4. The fuel cell purging control method according to claim 1, wherein when the hydrogen purge is determined, an air supply amount is reduced by a predetermined decrement, relative to a set air supply amount, and
    the set air supply amount is an air supply amount when the fuel cell is normally operated.

5. A fuel cell purging control method for controlling hydrogen purge of a fuel cell including a stack having an anode and a cathode, an air supply device having an air supply line supplying air to the cathode of the stack, and a hydrogen supply device supplying hydrogen to the anode of the stack, the fuel cell purging control method comprising the steps of:
    determining, by a controller, the hydrogen purge of the fuel cell while the fuel cell is being normally operated;
    fixing revolutions per minute (RPM) of the air supply unit of the fuel cell to a previous RPM and maintaining the RPM when hydrogen purge is determined in the purge determining operation; and
    purging hydrogen in the anode of the fuel cell, by opening a purge valve, for a preset period of time after the step of fixing the RPM.

6. The fuel cell purging control method according to claim 5, wherein when an accumulated charge amount of the fuel cell is greater than a set value, the hydrogen purge is determined.

7. A fuel cell purging control system for controlling hydrogen purge of a fuel cell, comprising:
    a stack having an anode and a cathode;
    an air supply device having an air supply line supplying air to the cathode of the stack;
    a back pressure adjusting valve configured to reduce back pressure of the air supply device when the hydrogen purge is determined;
    a hydrogen supply device supplying hydrogen to the anode of the stack; and
    a purge valve configured to purge hydrogen in the anode of the fuel cell for a preset period of time after the back pressure adjusting valve is opened,
    wherein the hydrogen purge of the fuel cell is determined while the fuel cell is being normally operated.

* * * * *